Jan. 14, 1930.                    K. MOEGER                    1,743,792
                              TELEMETRIC TRANSMITTER
                              Filed April 20, 1927

Inventor:
Kurt Moeger,
by
His Attorney.

Patented Jan. 14, 1930

1,743,792

UNITED STATES PATENT OFFICE

KURT MOEGER, OF BERLIN, GERMANY, ASSIGNOR TO GENERAL ELECTRIC COMPANY, A CORPORATION OF NEW YORK

TELEMETRIC TRANSMITTER

Application filed April 20, 1927, Serial No. 185,289, and in Germany November 5, 1926.

My invention relates to telemetric systems and in particular to a telemetric transmitter which imposes no torque or friction on the measuring instrument, the indications of which are to be transmitted to a distant point. In carrying my invention into effect I employ a photoelectric cell and special means responsive to the deflection of the measuring instrument for accurately varying the degree of light on such cell.

The features of my invention which are believed to be novel and patentable will be pointed out in the claim appended hereto. For a better understanding of my invention reference is made to the following description to the accompanying drawing in which Fig. 1 shows the essential parts of a telemetric system in which relatively rotatable Nicol prisms are employed in the transmitter; and Fig. 2 shows a transmitter employing a movable graduated light screen.

Figure 1:
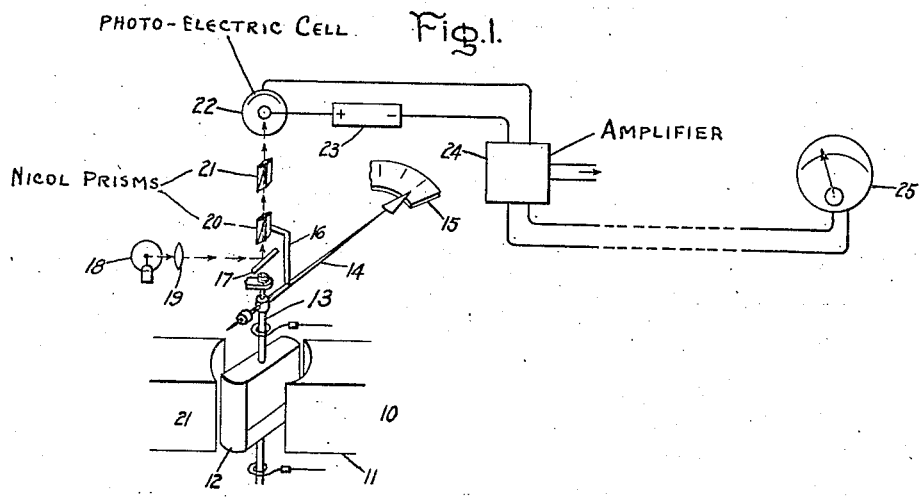
Figure 2:
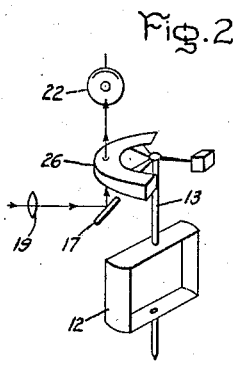

Referring to Fig. 1, 10 represents an electric measuring instrument of the indicating type. This device may obviously be any movable indicating device, but I have represented a sensitive electrical measuring instrument because it is important that no additional torque or friction be imposed on such instruments if they are to give accurate indications. 11 represents the stationary field of the instrument, and 12 the rotatable armature. The armature is carried on a shaft 13 which also carries the usual pointer 14. The pointer cooperates with a scale a portion of which is indicated at 15. It will be assumed that the angle of deflection extends over an arc of about 90 degrees.

The upper end of the shaft has an offset portion 16 extending around a stationary mirror 17. The mirror is set at a suitable angle on the axis of rotation of the instrument so as to reflect parallel light rays from a constant light source 18 and lens 19 upward along the axis of rotation. This beam of light is directed to a Nicol prism 20 which is supported by the upper end of the shaft part 16 also in the axis of rotation of the instrument. Located above prism 20 is a second Nicol prism 21 which is stationary, and located above prism 21 is a photo-electric cell 22. The two prisms have their longitudinal axes in alinement on the axis of rotation of shaft 13 and also in alinement with the normal path of the light rays directed from mirror 17 to the photo-electric cell 22. It is seen that as the instrument armature 12 moves through its angle of deflection the prism 20 is rotated through an angle of about 90 degrees. The Nicol prisms as thus arranged have the power to gradually and uniformly intercept or cut off all the light reflected from mirror 17 to cell 22 as prism 20 is rotated through a 90 degree angle. The prisms are so positioned with respect to each other that all the light is cut off at one end of the deflection angle and a maximum amount of light is allowed to pass at the other end of the deflection angle. As thus arranged the light falling on the photo-electric cell is gradually and uniformly varied over the deflection range of the instrument and no additional torque or friction is imposed on the instrument. In the position shown the maximum amount of flight is allowed to pass through the prisms to the cell.

The photo-electric cell is contained in an electric circuit including a source of voltage 23 such as a storage battery and an amplifier 24 where that is necessary or desirable. The photo-electric cell produces a uniform variation in the current flowing in this circuit for uniform variations in the instrument deflection and such current after being amplified, if necessary, is caused to operate a receiving instrument 25 calibrated with the transmitting instrument.

It will be apparent that this form of transmitter is also suitable for sending impulses where the shaft rotates continuously as in a watthour meter.

In Fig. 2 I have represented a simplified transmitter where the two Nicol prisms are replaced by a graduated light screen in the form of a wedge-shaped circular member 26 which may be made of a translucent material which allows practically no light to pass through the thick end but passes practically all the light through the thin end. It will be understood that in either modification suitable screens are to be provided for preventing all light rays from striking the photo-electric cell except those coming through the transmitter system.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

A telemetering transmitter comprising a light source, a photo-electric cell, means for directing light from said source to said cell, a pair of Nicol prisms having their longitudinal axes in alinement with each other and in the normal path of the light rays directed to said cell, a measuring instrument having a movable element, and means whereby the movement of said element causes the rotation of one of said Nicol prisms with respect to the other about its longitudinal axis, said movement serving to vary the light falling upon said cell in proportion to the extent of such movement.

In witness whereof, I have hereunto set my hand this 1st day of April, 1927.

KURT MOEGER.